United States Patent
Davydycheva

(10) Patent No.: US 9,891,339 B2
(45) Date of Patent: Feb. 13, 2018

(54) METHOD AND APPARATUS FOR DETECTING AND MAPPING SUBSURFACE ANOMALIES

(71) Applicant: Sofia N. Davydycheva, Houston, TX (US)

(72) Inventor: Sofia N. Davydycheva, Houston, TX (US)

(*) Notice: Subject to any disclaimer, the term of this patent is extended or adjusted under 35 U.S.C. 154(b) by 12 days.

(21) Appl. No.: 14/275,839

(22) Filed: May 12, 2014

(65) Prior Publication Data

US 2016/0084980 A1  Mar. 24, 2016

Related U.S. Application Data

(63) Continuation-in-part of application No. 13/133,973, filed on Jun. 10, 2011, now Pat. No. 8,762,062.

(51) Int. Cl.
*G01V 3/38* (2006.01)
*G01V 3/08* (2006.01)

(52) U.S. Cl.
CPC ........ G01V 3/083 (2013.01); *G01V 2003/086* (2013.01)

(58) Field of Classification Search
CPC ..... G01V 3/12; G01V 3/083; G01V 2003/086
USPC .......................................................... 702/5
See application file for complete search history.

(56) References Cited

U.S. PATENT DOCUMENTS

| 7,203,599 | B1 | 4/2007 | Strack et al. | |
|---|---|---|---|---|
| 7,737,699 | B2* | 6/2010 | Rykhlinski | G01V 3/06 324/358 |
| 7,788,049 | B2* | 8/2010 | Bryant | G01V 1/22 702/12 |
| 2011/0320125 | A1* | 12/2011 | Rykhlinskaya | G01V 3/12 702/5 |

FOREIGN PATENT DOCUMENTS

EP  1887386  * 2/2008

* cited by examiner

*Primary Examiner* — Stephanie Bloss
(74) *Attorney, Agent, or Firm* — Ira M. Turner

(57) ABSTRACT

A method for estimating at least one geophysical property is disclosed. The method includes using a plurality of transmitter electrodes distributed in a conductive medium, periodically passing rectangular current impulses through the media; collecting a sequence of sounding data between each of the impulses with a receiver electrode disposed between the plurality, determining a first difference and a second difference of the electric potential between points of the collected data; when each of the transmitters is excited, acquiring a focused measurement by simultaneously calculating a combination of at least one orthogonally weighted measurement and at least one axially weighted measurement obtained by the receiver, wherein the weighting is obtained from a condition of equipotentiality in four outer electrodes of the receiver; and, applying a time-differentiation technique to obtain deep measurements that exhibit low noise contribution from shallow features. An apparatus is also disclosed.

10 Claims, 7 Drawing Sheets

METHOD AND APPARATUS FOR DETECTING AND MAPPING SUBSURFACE ANOMALIES

BACKGROUND OF THE INVENTION

1. Field of the Invention

The present invention relates to the field of controlled source electromagnetic surveying, characterizing subterranean conditions and formations, and in particular to three-dimensional assessment of subsurface anomalies such as electrical resistivity anomalies or anomalies of the induced polarization parameters of the subterranean medium. More specifically, the invention relates to methods for acquiring transient electromagnetic surveys.

2. Description of the Related Art

In the never-ending exploration for oil and gas, identification of geologic anomalies that may contain petrochemicals requires application of increasingly sophisticated techniques. A variety of instruments may be used (and may employ technologies such as radiation measurement (gamma and neutron generation), and measurements involving acoustic, seismic, resistivity, magnetic resonance, are often used as is fluid sampling, and various other forms of spectroscopy). A variety of these instruments are useful for characterizing geologic anomalies within a well. Unfortunately, these techniques necessarily require having the well in order to work. If possible, it is preferred to obtain indications prior to the resource commitment involved in drilling the well.

Various techniques for evaluation of sub-surface anomalies from the surface are known. More specifically, technology is available that makes use of electrical resistivity or of the induced polarization parameters such as intrinsic chargeability of rocks or the time-decay constant of the induced polarization potential, based on grounded dipole and quadrupole measurements.

One example is disclosed in U.S. Pat. No. 7,203,599, issued Apr. 10, 2007 to Strack et al., and entitled "Method for acquiring transient electromagnetic survey data." This patent discloses a method for controlled source electromagnetic Earth surveying that includes deploying a plurality of electromagnetic sensors in a selected pattern at the top of an area of the Earth's subsurface to be surveyed. At least one of a transient electric field and a transient magnetic field is applied to the Earth in the vicinity of the sensors at a plurality of different positions. At least one of electric field amplitude and magnetic field amplitude at each of the sensors is recorded each time the transient electric field and/or magnetic field is applied. Each recording is adjusted for acquisition geometry. An image is generated corresponding to at least one sensor position using at least two stacked, adjusted recordings.

The techniques of Strack et al. are limited to dipole measurements in the time domain. Unfortunately, this results in limited resolution and is computationally intensive.

What are needed are improved techniques for performing electromagnetic surveys of sub-surface anomalies. Preferably, the techniques are efficient and flexible and result in more descriptive information than previously achieved.

BRIEF SUMMARY OF THE INVENTION

Methods and apparatus for marine or terrestrial (land based) geoelectrical exploration use a current dipole source to send electric pulses into the medium. Geometrical probing is performed during pulses of the current, and probing on transient processes is performed in the intervals. Measurements are taken using measuring apparatus mounted on the seafloor or ground, or towed close to the water surface.

The apparatus includes several electrodes forming a measuring quadrupole: a central electrode with others around it. The same electrodes are also grouped to form measuring dipoles: During the current flow period and during the intervals between current pulses, the second electric potential difference between external electrodes and the central electrode are measured by the quadropole, as well as the first electric potential differences between external electrodes are measured by the dipoles. Measured values are used to calculate up to three sets of the electrical parameters of the medium. A model of the medium is reconstructed from these parameters. The disclosed techniques provide the elimination of unwanted lateral effect on the probing results, and enable delineation of hydrocarbon accumulations.

Time differentiation of the measured dipole and quadrupole responses and/or their combinations is applied to remove shallow effects of near-surface or shallow features.

BRIEF DESCRIPTION OF DRAWINGS

The features and advantages of the invention are apparent from the following description taken in conjunction with the accompanying drawings in which.

DETAILED DESCRIPTION OF THE INVENTION

Disclosed herein are methods and apparatus for performing resistivity surveys that eliminate or substantially reduce the effect of near-surface (or "shallow") anomalies. Advantageously, the techniques provide for limiting the influence of shallow anomalies in land or marine environments.

Figure 1:
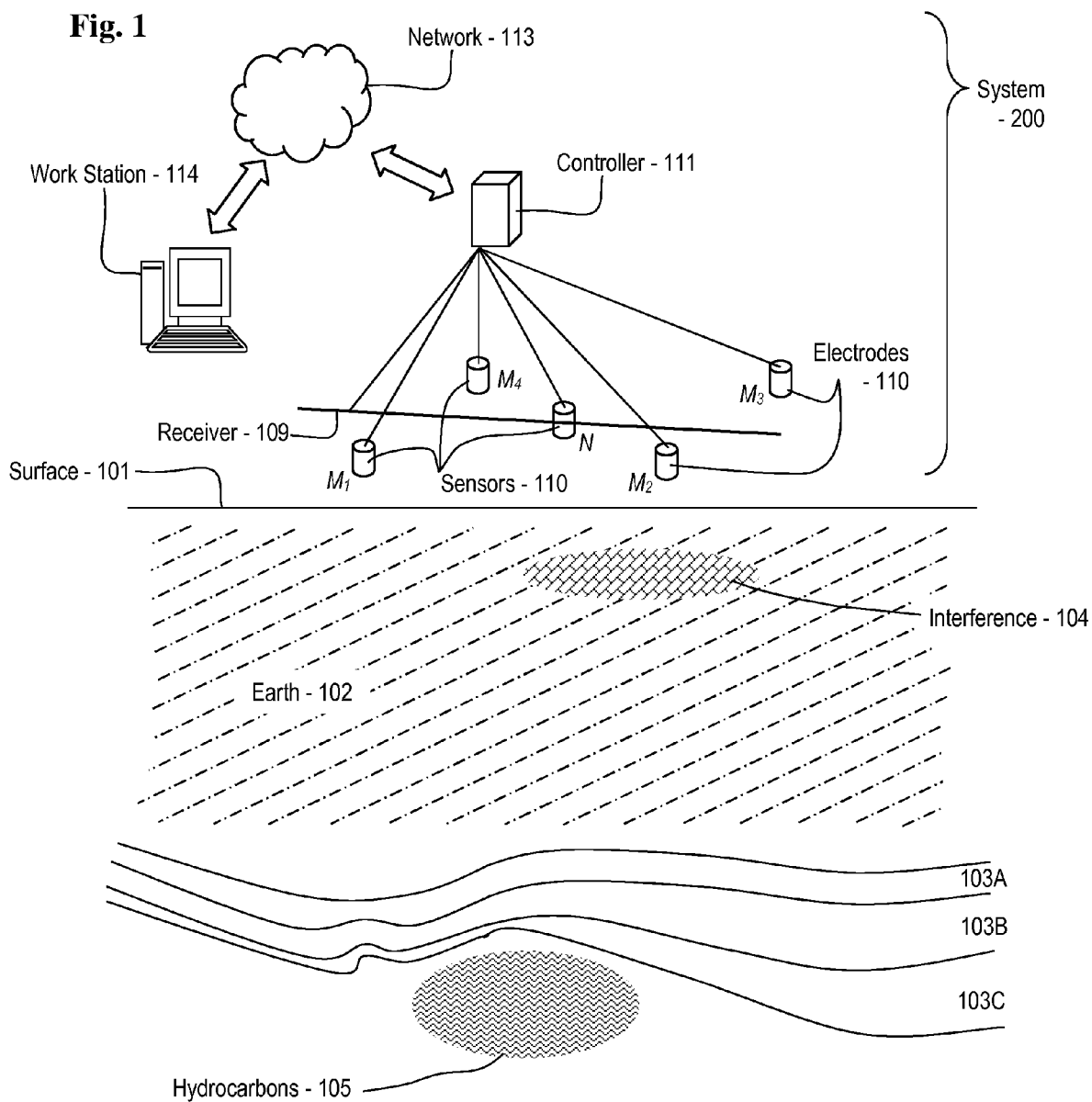
FIG. 1 is a schematic diagram depicting an overview of an apparatus for implementing techniques disclosed herein.

Referring now to FIG. 1, an exemplary embodiment of a system 200 for performing focused resistivity measurements is shown. The exemplary system 200 includes a receiver 1 and a plurality of electrodes 110. The receiver 1 includes the plurality of electrodes 110, which are electrically connected and controlled by a controller 111. The controller 111 communicates with a workstation 114. Communication with a workstation 114 may be through network 113. Generally, the controller 111 includes all components as needed or appropriate to control the system 200. For example, the controller 111 may include at least one of a power supply, communications capabilities, a user interface and other such components.

Generally, the workstation 114 includes conventional computing resources as deemed appropriate for implementation of the system 200. For example, the workstation 114 may include a plurality of processors as are known in the art. The processors may be coupled to memory and other components via a system bus as are known in the art. Read only memory (ROM), random access memory (RAM) and other forms of storage may be included and may provide a built-in operating system open (BIOS) which control certain that aspects of the workstation 114. Generally, the workstation 114 may implement various types of data storage, communications protocols, user interfaces, and other such technologies as deemed appropriate. The workstation 114 may be independent (that is, provide all functionality required for the system 200) or may be interconnected. For example, the workstation 114 may be an independent computer, such as a personal computer (PC). In some embodiments, the workstation 114 may provide a user interface, while being coupled to or in communication with another system for processing of data. Accordingly, the workstation 114 may be provided as a computing system (such as a personal computer), a mobile system (such as a tablet style of computer) or in any form deemed appropriate by a party implementing or designing the system 200.

Generally, the workstation 114 stores machine readable instructions on machine readable media (such as in ROM, RAM, a mass storage unit, a hard drive or other such device). The machine readable instructions (referred to herein as "software," as an "application," as a "client," and by other similar terms) generally provide for functionality as will be discussed in detail further herein.

In the embodiment shown, the system 200 is disposed on the surface 101 of the Earth 102. The system 200 is configured for measuring resistivity in media 102, (i.e., the Earth), including through formations 103A, 103B and 103C, and identifying a sub-surface anomaly, in this case, a deep deposit of hydrocarbons 105. By virtue of the techniques disclosed herein, the system 200 is able to discount unwanted effects of shallow anomalies, such as interference 104.

In some other embodiments, the system 200 is configured for use in a marine environment (not shown).

Generally, the receiver 1 functions as a receiving device for performing measurements of a dipole established between the receiver 1 and each of the electrodes 110. Separately, the plurality of electrodes 110 establish a five-electrode quadrupole. These arrangements are discussed and qualified further herein.

Generally, systems that are similar to the one depicted in FIG. 1 are used in resistivity evaluations. Traditional implementations of such equipment yield systems that are sensitive to near-surface or shallow resistivity anomalies. Unfortunately, these systems are much less sensitive to deeper anomalies of interest.

Removal of the sensitivity to shallow anomalies is important in application to land and shallow-water marine versions. For example, such a near-surface anomaly as variable water depth in shallow-water marine version (so called bathymetry effect) is known to introduce strong effect on both dipole and quadrupole measurements. Near-surface anomalies in deep-water environment can include methane-hydrate deposits often situated in marine sediments close to the seafloor. Their effect can shade the wanted effect of deeper anomalies.

In order to provide some context for implementation of the system 200 according to the teachings herein, some further aspects are introduced.

As discussed herein, "electric quadrupole," "quadrupole" and other similar terms generally related to a charge or current distribution that produces an electric field equivalent to that produced by two electric dipoles whose dipole moments have the same magnitude but point in opposite directions and which are separated from each other by a small distance.

In order to remove/decrease the sensitivity to near-surface anomalies the following post-processing called time differentiation is disclosed.

Referring now to FIGS. 2-7, aspects of a method and an apparatus adapted for focusing of current is provided. The method provides for removing both horizontal components of the current density, $j_x$ and $j_y$, under the receiver 1 simultaneously. The apparatus includes a plurality of electrodes 110 distributed in relation to the media 102 (i.e., the Earth), the electrodes 110 adapted for being coupled to a power source (i.e., the controller 111). The power source provides periodic rectangular current impulses passed through the electrodes 110 into the media 102.

The system includes a plurality of receivers for collecting a sequence of sounding data between each of the impulses and a processor 114 for receiving the measured data and simultaneously determining the first differences $\Delta U$ and the second differences $\Delta^2 U$ of the electric potential; then, a weighted focused measurement is formed to estimate electrical conductivity of the media 102 and polarization parameters induced in the media.

A quadrupole receiver that includes four outer electrodes ($M_1$, $M_2$, $M_3$, $M_4$) in a rectangular pattern to create a substantially horizontal measurement plane, and a fifth electrode (N) approximately in a center of the rectangle is provided (FIGS. 2-7).

Figure 2:
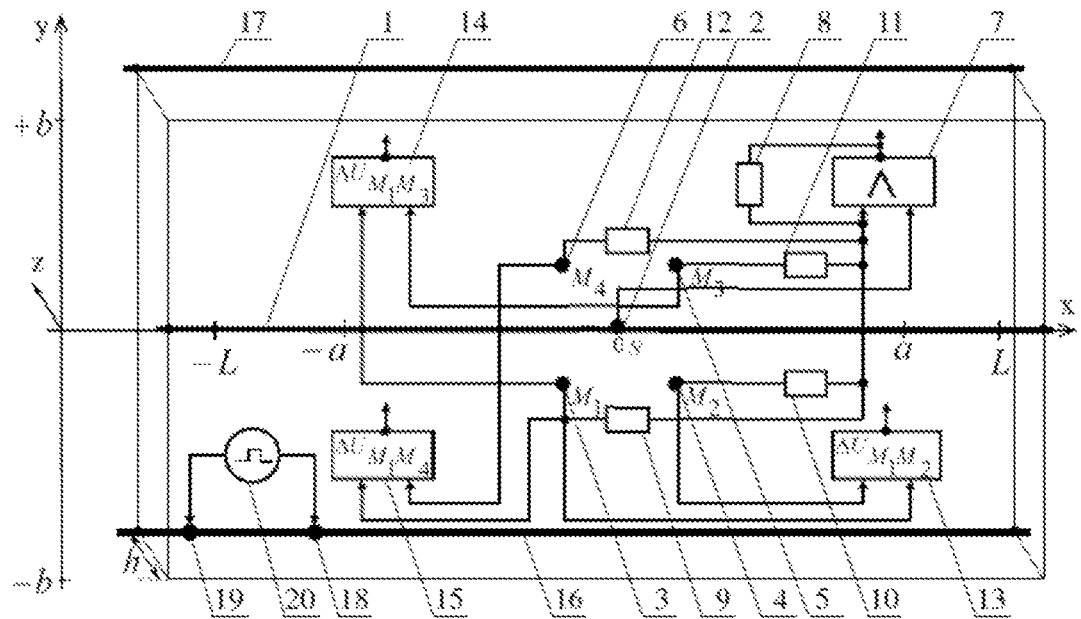
FIG. 2 is a schematic diagram depicting aspects of an electrical topology for an apparatus for implementing techniques disclosed herein.

In FIG. 2, some aspects of the electrical setup of an embodiment of the system are shown. In this example, setup includes a measuring device 1 (also referred to as the "receiver" 1) including dipoles for measuring the first differences of electrical potential and a five-electrode quadrupole (2, 3, 4, 5, 6) for measuring a second difference. This receiver 1 is located on the measurement profile. The receiver 1 may be laid on the ground or seafloor. The receiver may be towed in seawater at certain depth below the sea surface on a cable.

The electrodes (2, 3, 4, 5, 6) of the quadrupole measuring apparatus are denoted as four external electrodes $M_1$, $M_2$, $M_3$, $M_4$ and a central electrode N. A quadrupole meter 7 is provided for measuring of a second difference of electric field potentials $\Delta^2 U_{M1M2M3M4N}$ between all four electrodes 2, 3, 4, 5 ($M_1$, $M_2$, $M_3$, $M_4$) of the measuring device 1 and the central electrode (N). Scaling feedback resistance of the input amplifier of meter 7 is depicted by reference number 8. Reference numbers 9, 10, 11 and 12 represent summing resistances for summing up potentials $U_{M1}$, $U_{M2}$, $U_{M3}$, $U_{M4}$ of the external measuring electrodes 2, 3, 4, 5 $M_1$, $M_2$, $M_3$, $M_4$ (where use of subscripts, such as with $M_1$ $M_2$ $M_3$ and $M_4$, indicate correlation to a respective one of the electrodes). Reference number 13 represents the first difference of electric field potentials $\Delta U_{M1M2}$ between electrodes $M_1$ and $M_2$. Reference number 14 represents the first difference of electric field potentials $\Delta U_{M1M3}$ between electrodes $M_1$ and $M_3$. Reference number 15 represents the first difference of electric field potentials $\Delta U_{M1M4}$ between electrodes $M_1$ and $M_4$.

Figure 3:
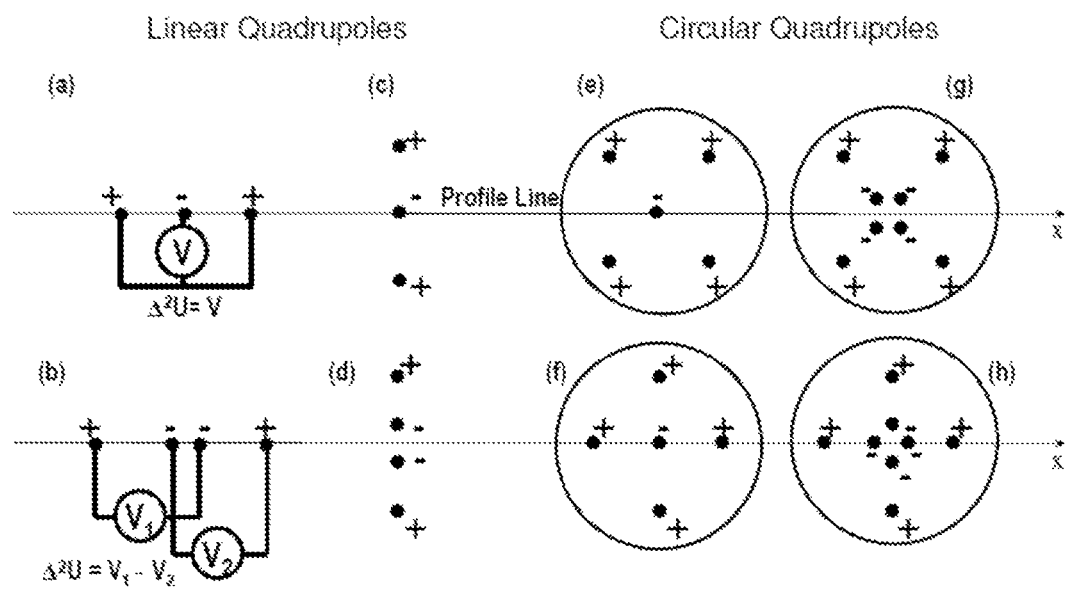
FIG. 3 depicts aspects of various arrangements of quadrupole receivers as may be used in the system of FIG. 1.
Figure 4:
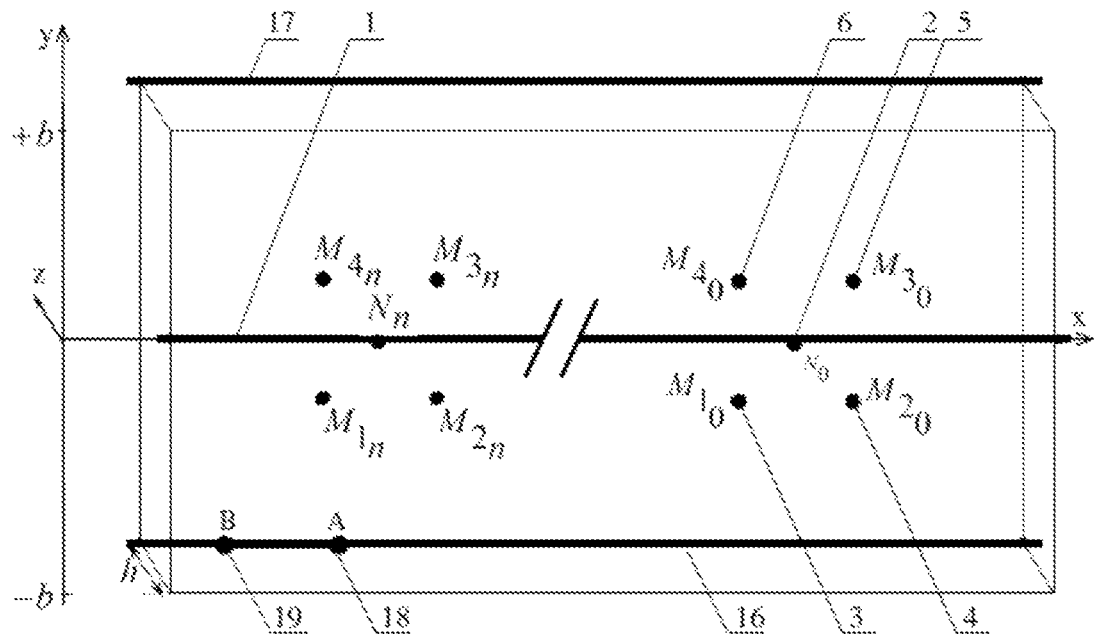
FIG. 4 shows several 5-electrode receivers placed on the measurement profile 1: any number of receivers may be placed on the measuring profile 1; besides, the receivers may be placed on other measuring profiles, parallel to profile 1.

FIG. 3 depicts some of the possible versions of the quadrupole receiver for the measurement of $\Delta^2 U$ that can be applied. FIGS. 3a, 3b, 3c and 3d depicts aspects of linear quadrupoles. For the linear quadrupoles, all electrodes are placed along a line. In these illustrations, either a measurement profile line (3a, 3b), or a line perpendicular to the measurement profile line (3c, 3d). FIGS. 3e, 3f, 3g and 3h depict aspects of circular quadrupoles having one or more internal electrodes and more than two outer electrodes. In each case (FIGS. 3a-3h), the second difference of the electric potential $\Delta^2 U$ can be measured either directly, using just one voltage detector, whose positive and negative terminals are connected to the respective electrodes as in FIG. 3a, or $\Delta^2 U$ can be calculated through mathematical subtraction of separate dipole measurements $\Delta U$ using separate voltage detectors as depicted in FIG. 3b. However, the last method can lead to noisier measurements, due to noise introduced through mathematical subtraction of close measurements.

In order to ensure the focusing of electric field in the central electrode N, two profiles parallel to the measurement profile may be placed to the right and left of the measuring device 1 in the water layer at a height h above the seafloor, or on the sea surface, or on the ground (in such a case h=0). Here, reference number 16 represents the first profile and reference number 17 represents the second profile. A horizontal dipole current source that includes two electrodes 18 and 19 is moved along these two profiles. The electrodes are fed by rectangular current impulse generator 20.

The measurement $R_{xy}(t_i)$ based on transient measurement with four offsets, excited by dipole sources $B_1A_1$, $A_2B_2$, $A_3B_3$, $B_4A_4$ having coordinates x=−a, y=−b, z=+h, x=+a, y=−b, z=+h, x=+a, y=+b, z=+h and x=−a, y=+b, z=+h, respectively, whereas the receiver coordinates are x=0, y=0, z=0 (FIG. 4) is calculated using the formula provided in Eq(1):

$$R_{xy}(t_i) = \Delta U_{M1M3}(I_{B1A1}, t_i) / \{[\Delta^2 U_{M1M2M3M4N}(I_{B1A1}, t_i)] + k_1(t_i) \cdot [\Delta^2 U_{M1M2M3M4N}(I_{A2B2}, t_i)] + k_2(t_i) \cdot [\Delta^2 U_{M1M2M3M4N}(I_{A3B3}, t_i)] + k_3(t_i) \cdot [\Delta^2 U_{M1M2M3M4N}(I_{B4A4}, t_i)]\}, \quad (1);$$

where:
$k_1(t_i)$, $k_2(t_i)$, $k_3(t_i)$ are the focusing coefficients, which ensure equipotentiality of the closed line containing the four external electrodes of the measuring device.

Figure 5:
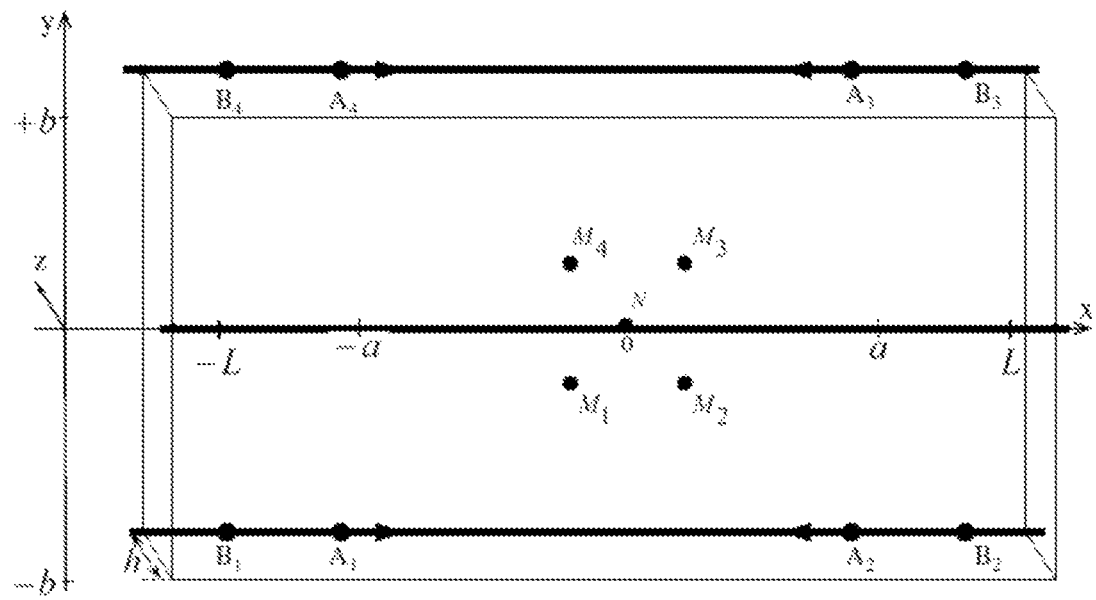
FIG. 5 shows arrangement of the dipole sources along the two profiles parallel to the measurement profile.
Figure 6:
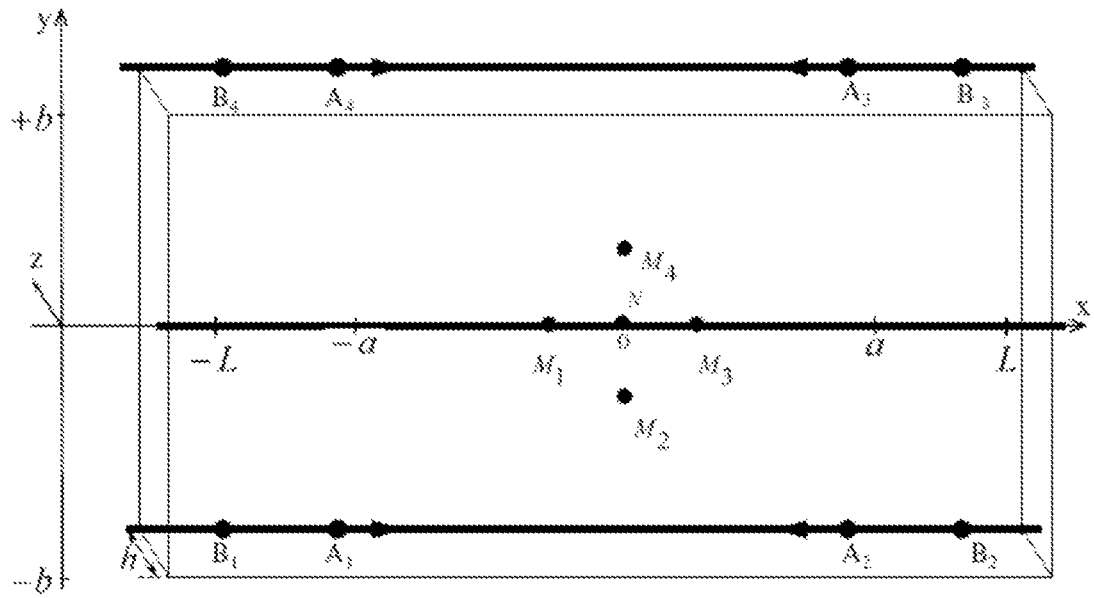
FIG. 6 shows a version of the arrangement of the quadrupole receiver with respect to the two source profiles parallel to the measurement profile.
Figure 7:
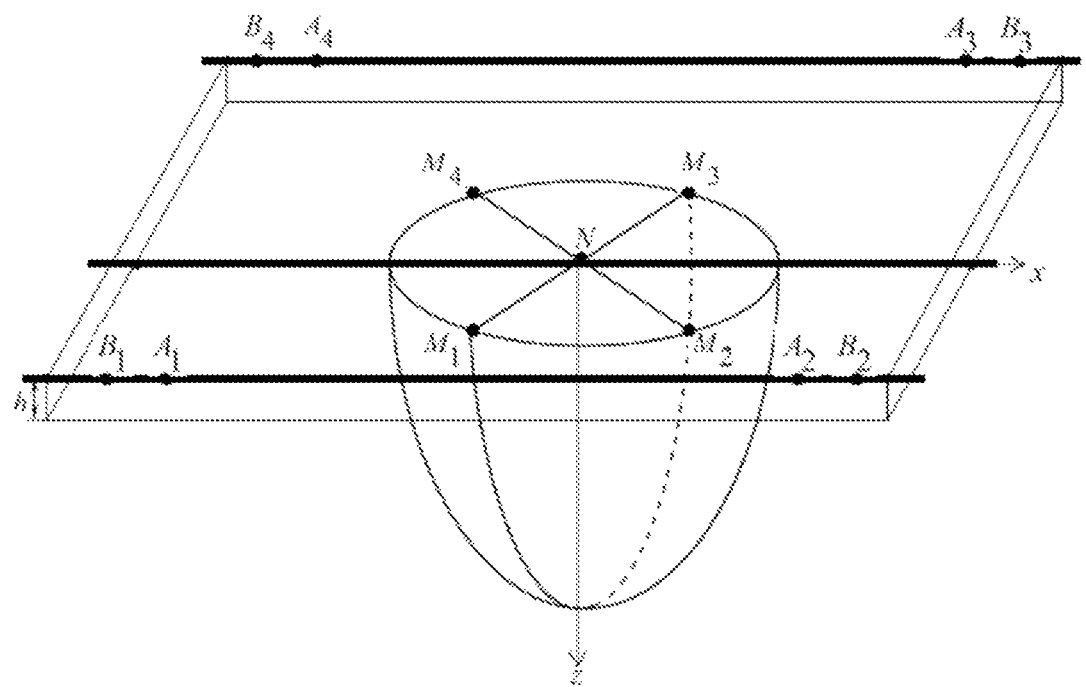
FIG. 7 shows equipotential surface containing the outer electrodes of the quadrupole receiver created by several dipole sources arranged around the receiver. When the electric potentials at the points $M_1$, $M_2$, $M_3$, $M_4$ are equal, both horizontal current density components $j_x$, and $j_y$, are fully cancelled inside the horizontal circle formed by these points, and thus the electric current at the point N is focused vertically downward.
Figure 8A:
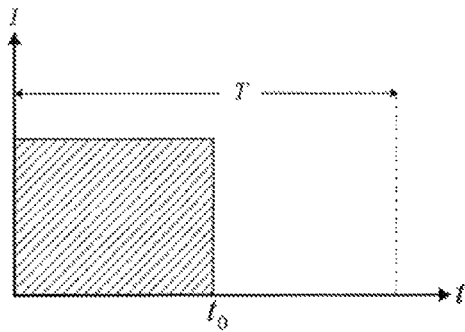
FIGS. 8A and 8B, collectively referred to herein as FIG. 8, show the shapes of single impulses in the time domain t: a) the shape of a single rectangular current source impulse I in the circuit of dipole source AB; b) the shapes of the first and second differences of the electrical potentials in the measuring devices $\Delta^n U$, where n=1 and 2.
Figure 8B:
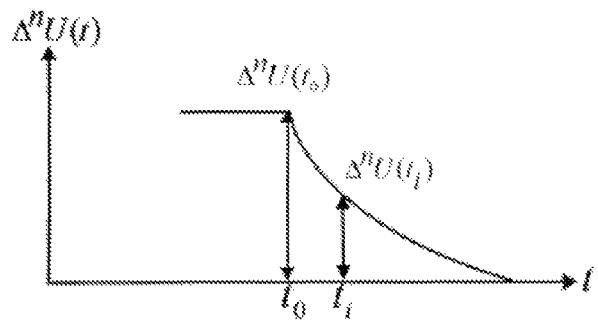

Thus, both horizontal current density components, $j_x$ and $j_y$, inside the contour of this line are fully eliminated at all times $t_i$, if the coefficients are calculated from the system of three equations provided in Eq. (2):

$$\Delta U_{M1M2}(I_{B1A1}, t_i) + k_1(t_i) \cdot \Delta U_{M1M2}(I_{A2B2}, t_i) + k_2(t_i) \cdot \Delta U_{M1M2}(I_{A3B3}, t_i) + k_3(t_i) \cdot \Delta U_{M1M2}(I_{B4A4}, t_i) = 0$$

$$\Delta U_{M1M3}(I_{B1A1}, t_i) + k_1(t_i) \cdot \Delta U_{M1M3}(I_{A2B2}, t_i) + k_2(t_i) \cdot \Delta U_{M1M3}(I_{A3B3}, t_i) + k_3(t_i) \cdot \Delta U_{M1M3}(I_{B4A4}, t_i) = 0$$

$$\Delta U_{M1M4}(I_{B1A1}, t_i) + k_1(t_i) \cdot \Delta U_{M1M4}(I_{A2B2}, t_i) + k_2(t_i) \cdot \Delta U_{M1M4}(I_{A3B3}, t_i) + k_3(t_i) \cdot \Delta U_{M1M4}(I_{B4A4}, t_i) = 0 \quad (2);$$

where:
$t_i$ are time moments between current impulses (i=0, 1, ..., N), wherein $t_0$ represent the time moment of switching-off the current;

$\Delta U$ is the electric dipole measurement, i.e. the difference of the electric potential between two electrodes;

$\Delta^2 U$ is the second difference of the electric potential in the receiver measured by the electric quadrupole;

$B_1A_1$, $A_2B_2$, $A_3B_3$, $B_4A_4$ are coordinates of the moving dipole current source (FIGS. 5, 6, 7);

I is the source current;

$\Delta^2 U_{M1M2M3M4N}(I_{B1A1}, t_i)$,
$\Delta^2 U_{M1M2M3M4N}(I_{B4A2B2}, t_i)$,
$\Delta^2 U_{M1M2M3M4N}(I_{A3B3}, t_i)$, and
$\Delta^2 U_{M1M2M3M4N}(I_{B4A4}, t_i)$ are the second differences of electrical potentials between the four electrodes $M_1$, $M_2$, $M_3$, $M_4$ of the circular electric quadrupole and the central electrode N measured at time, $t_i$, and excited by the dipole sources $B_1A_1$, $A_2B_2$, $A_3B_3$, $B_4A_4$, respectively; and $\Delta U_{MkMj}(I_{BnAm}, t_i)$,
(k=1,2,3,4; j=1,2,3,4;
n=1,2,3,4; and m=1,2,3,4) are the first differences of electrical potential between the respective electrodes $M_k$ and $M_j$, excited by source, $B_nA_m$, and measured at time, $t_i$.

The setup depicted in FIG. 7 also makes possible a reduced measurement scheme using a linear quadrupole receiver coaxial to the measurement profile (FIGS. 3a, 3b), by analyzing two ratios of dipole and quadrupole measurements from two transmitters, or ratios of the first and the second differences of the electric potential, as provided in Eq. (3):

$$R_x(t_i) = \Delta U_{M1M3}(I_{B1A1}, t_i) / \{\Delta^2 U_{M1\,N\,M3}(I_{B1A1}, t_i) + k_1(t_i) \cdot \Delta^2 U_{M1\,N\,M3}(I_{A2B2}, t_i)\}, \quad (3);$$

where
$\Delta^2 U_{M1\,N\,M3} = U_{M1} - 2U_N + U_{M3}$ is the second difference of the electric potential measured by the linear quadrupole, $k_1(t_i)$ represents the focusing coefficient, which ensures equipotentiality of two external electrodes $M_1$ and $M_3$ of the receiver, when excited by the transmitter currents $I_{B1A1}$ and $I_{A2B2}$, as provided in Eq. (4):

$$\Delta U_{M1M3}(I_{B1A1}, t_i) + k_1(t_i) \cdot \Delta U_{M1M3}(I_{A2B2}, t_i) = 0. \quad (4)$$

This condition fully cancels the effect of the horizontal x-directed current density component $j_x$ at all times, $t_i$, reducing the sensitivity to the lateral variations of the resistivity and increasing the sensitivity to deeper structures situated below the receiver.

The setup depicted in FIG. 6 also makes possible a reduced measurement scheme using a linear quadrupole receiver orthogonal to the measurement profile (FIGS. 3c, 3d), by analyzing two ratios of dipole and quadrupole measurements from two transmitters, or ratios of the first and the second differences of the electric potential. One technique is provided for in Eq. (5):

$$R_y(t_i) = \Delta U_{M2M4}(I_{B1A1}, t_i) / \{\Delta^2 U_{M2\ N\ M4}(I_{B1A1}, t_i) + k_1(t_i) \cdot \Delta^2 U_{M2\ N\ M4}(I_{A4B4}, t_i)\}, \quad (5)$$

where $\Delta^2 U_{M2\ N\ M4} = U_{M2} - 2U_N + U_{M4}$ is the second difference of the electric potential measured by the linear quadrupole, $k_1(t_i)$ is the focusing coefficient, which ensures equipotentiality of two external electrodes $M_2$ and $M_4$ of the receiver, when excited by the transmitter currents $I_{B1A1}$ and $I_{A4B4}$, as provided in Eq.(6):

$$\Delta U_{M2M4}(I_{B1A1}, t_i) + k_1(t_i) \cdot \Delta U_{M2M4}(I_{A4B4}, t_i) = 0. \quad (6)$$

This condition cancels the effect of the horizontal y-directed current density component, $j_y$, at all times, $t_i$, thus reducing the sensitivity to the lateral variations of the resistivity and increasing the sensitivity to deeper anomalies situated below the receiver.

Embodiments depicted in FIGS. 1-7 are relevant and applicable, provided equipotentiality of the external electrodes of the receiver is realized. This cancels the effect of either the horizontal current density component $j_x$, or $j_y$, or both of them, as depicted in FIG. 7.

In land based implementations, the system may make use of three parallel profiles. These are depicted in FIGS. 2, 4, 5, 6 and 7. In marine implementations, the receivers may be stationary and situated on the seafloor while the transmitters are towed above the receivers. A large array of measurement data may be generated. In some embodiments, the receivers disposed on the sea-floor register signals from the transmitter for all positions of the sea vessel, where the vessel moves along a few parallel profiles above the receiver line (for example, under a guidance system, such as GPS control). In some applications, the receivers may be towed after the transmitter.

The dipole and quadrupole measurements (i.e. the numerator and denominator of Eqs. (1), (3) or (5), as well as their ratios $R_{xy}(t_i)$, or $R_x(t_i)$, or $R_y(t_i)$ (i=0, 1, . . . , N), respectively, are then analyzed to estimate and image at least one of the electrical parameters of the conductive media. The parameters that may be imaged include, without limitation:

$\sigma_0$ which represents electric conductivity of elements of the medium, $\eta$ which represents a coefficient of induced polarization, and $\tau$ which represents a time decay constant of the induced polarization.

The analysis is performed based on solution of Maxwell's equations for the electromagnetic field in the polarized medium, whose frequency-dependent electric conductivity follows an empirically derived formula, such as Eq. (7):

$$\sigma(i\omega) = \sigma_0 \left(1 - \frac{\eta}{1 + (i\omega\tau)^c}\right), \quad (7)$$

where:

$\omega$ represents the angular excitation frequency $\eta$ represents the IP coefficient or the intrinsic chargeability of sedimentary rocks $\tau$ represents the time decay constant of the IP potential, and c represents the relaxation constant; usually $0 \le c \le 1$.

Since the electromagnetic properties of sub-surface materials (i.e., rock) that are saturated with water are substantially different from sub-surface materials saturated with hydrocarbons, these methods are generally effective for determining the presence of hydrocarbons in the subterranean structures.

However, sensitivity of the methods listed above to near-surface or shallow resistivity anomalies is typically stronger than the sensitivity to deeper anomalies. Unfortunately, with most of the valuable shallow deposits having been dissipated, it is the deeper anomalies that are of much greater interest. Therefore, reductions in sensitivity to shallow anomalies is important. Often, this is of particular interest for terrestrial and shallow-water marine versions, more than for deep-water marine settings, since in the terrestrial and shallow-water marine settings the near-surface anomalies are usually stronger. For example, such a near-surface anomaly as variable water depth in shallow-water marine version (so called bathymetry effect) is known to introduce strong effect on both dipole and quadrupole measurements.

Near-surface anomalies in deep-water setting can include methane-hydrate deposits often situated in marine sediments close to the seafloor. The effect of the methane-hydrate deposits can shade or obscure signals indicating deeper anomalies.

In order to reduce sensitivity to near-surface anomalies, post-processing techniques are disclosed. The post-processing techniques are referred to as "time differentiation." Time differentiation calls for a transient measurement to be taken in several receivers for a survey area, at several times after the current-off, as described above. This is described symbolically as:

$R^j(t_i)$, where i=0, 1, 2, . . . N;

j=1, 2, 3, . . . K; and, where $t_i$ represents time measurements between current impulses; and, j represents the receiver reference number.

Time differentiation post-processing provides for removing near-surface noise. In an exemplary embodiment, a basic receiver is chosen. The measurement is believed to be disturbed by a near-surface anomaly (note, that most often, a near-surface anomaly will disturb measurements of a remote receiver with respect to the anomaly). However, the receiver chosen may be situated close to a pilot well (where formation properties are known), or any other receiver. Normalized measurements are calculated for each time moment, as denoted by Eq.(8):

$$R^{norm,j}(t_i) = R^j(t_i) / R^{basic}(t_i) \quad (8);$$

where i=0, 1, 2, . . . N;

j=1, 2, 3, . . . K; and, where $R^{basic}(t_i)$ represents transient measurement in the basic receiver.

Time differentiation post-processing is completed to remove near-surface noise according to Eq. (9):

$$\Delta_t R^{norm,j}(t_i) = R^{norm,j}(t_i) - R^{norm,j}(t_{i-n}) \quad (9)$$

where
i=0, 1, 2, . . . N;
j=1, 2, 3, . . . K;
n can be any number from 1 to N, depending on the depth of interest.

The transient measurement $R^j(t_i)$ can be derived from either dipole measurements or quadrupole measurements as described above (i.e. dipole measurement $\Delta U$, quadrupole measurement $\Delta^2 U$, or their combinations $R_{xy\ (Eq.(1))}$, or $R_x$ (Eq.(3)) or $R_y$ (Eq.(5)) taken using setups depicted in FIGS. 1-7).

In short, the time differentiation techniques disclosed herein provide for obtaining "low noise" measurements of deep anomalies.

The method for time differentiation was modeled. Aspects of the model are depicted in FIG. 9, and results are depicted in FIGS. 10-13.

Figure 9A:
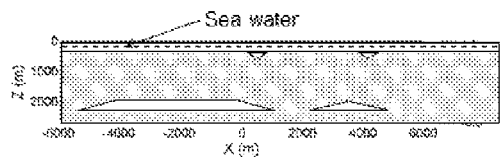
FIGS. 9A and 9B, collectively referred to herein as FIG. 9, show side-view (a) and top-view (b) of a model containing two 2-km-deep reservoirs situated below the seafloor. Two small resistive structures are situated right below the seafloor. The water depth is 200 m.
Figure 9B:
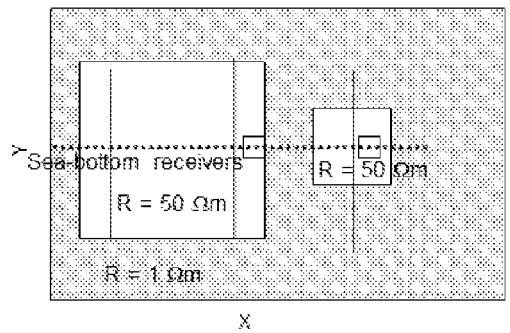

FIG. 9 depicts two deep structures that approximate typical shapes and sizes of actual oil reservoirs and were used for modeling. Also included are two shallow structures. FIG. 9A presents a side view, and FIG. 9B presents a top view. Both of the reservoirs are two km deep. The reservoirs exhibit a resistivity of 50-$\Omega$m, in a formation of isotropic resistivity of 1 $\Omega$m. The larger reservoir has vertices at $x_1=-5$, $z_1=2.25$; $x_2=-4$, $z_2=2.05$; $x_3=0$, $z_3=2.05$, $x_4=1$, $z_4=2.25$; $-3<y<3$. Note that all dimensions are in kilometers. The smaller reservoir has vertices at: $x_1=2$, $z_1=2.25$; $x_2=3.5$, $z_2=2.05$, and $x_3=5$, $z_3=2.25$; $-1.5<y<1.5$. Additionally, two shallow 50-$\Omega$m-resistive prisms with vertices at: $x_1=0.5$, $z_1=0.3$; $x_2=0.75$, $z_2=0.4$, and $x_3=1$, $z_3=0.3$; $-0.25<y<0.25$ (for the first shallow structure) and $x_1=4.1$, $z_1=0.3$; $x_2=4.35$, $z_2=0.4$, and $x_3=4.6$, $z_3=0.3$; $-0.25<y<0.25$ for the second shallow structure. Water depth is 0.2 km for the shallow features.

Figure 10A:
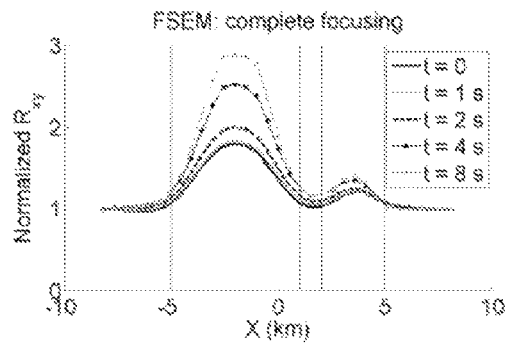
FIGS. 10A and 10B, collectively referred to herein as FIG. 10, show the response of the focused measurement to two deep reservoirs situated below the seafloor in the absence (a) and in the presence (b) of shallow inclusions.
Figure 10B:
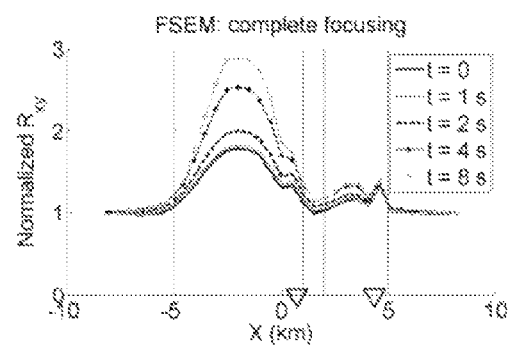

FIG. 10 shows the response of $R_{xy}$ to the model of two deep reservoirs in relation to the shallow structures (inclusions). That is, FIG. 10 shows a conventional response where no time differentiation has been applied. FIG. 10A shows response in the absence of the two shallow inclusions, and FIG. 10B shows response in the presence of the two shallow inclusions. In each case, response is shown as a function of a measurement at a midpoint between the inclusions. Each shallow structure gives a sharp spike, significantly distorting the deep reservoir responses at all times after switching-off the current.

Figure 11A:
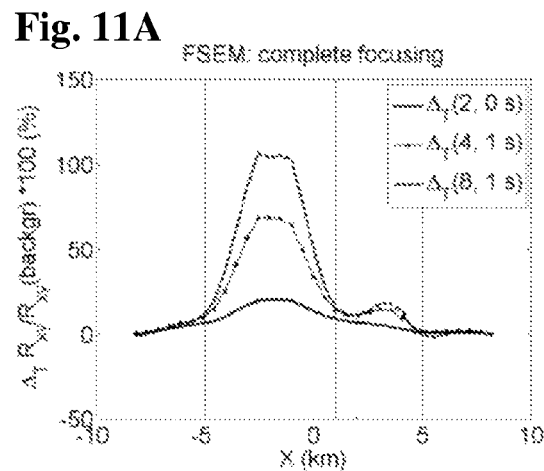
FIGS. 11A and 11B, collectively referred to herein as FIG. 11, show the time differentiation effect on the focused measurement.
Figure 11B:
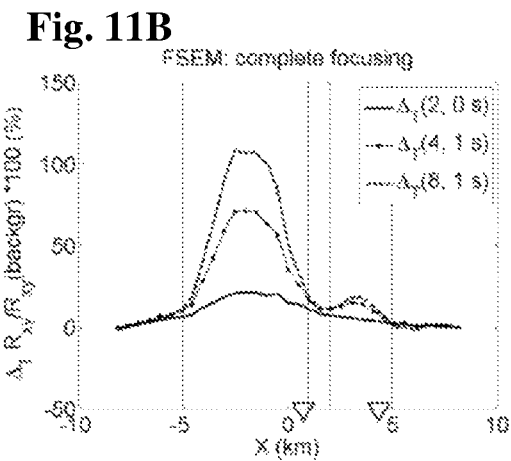
Figure 12A:
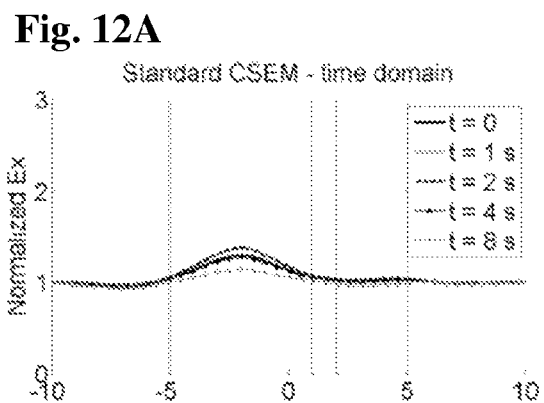
FIGS. 12A, 12B, 12C and 12D, collectively referred to herein as FIG. 12, show the response of the dipole-dipole measurement to two deep reservoirs situated below the seafloor in the absence (a) and in the presence (with separate graphs for normalized data 12A and absolute measurement data 12C) (b) of shallow inclusions (with separate graphs for normalized data 12B and absolute measurement data 12D)
Figure 12B:
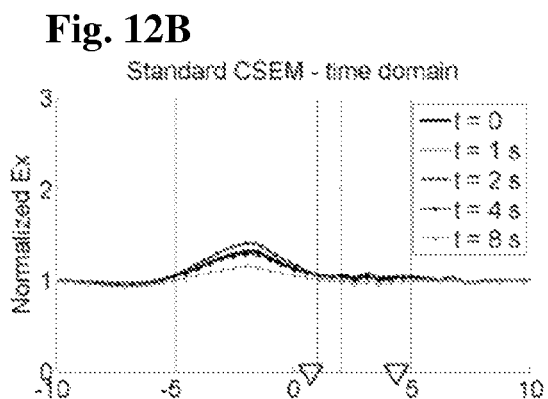
Figure 12C:
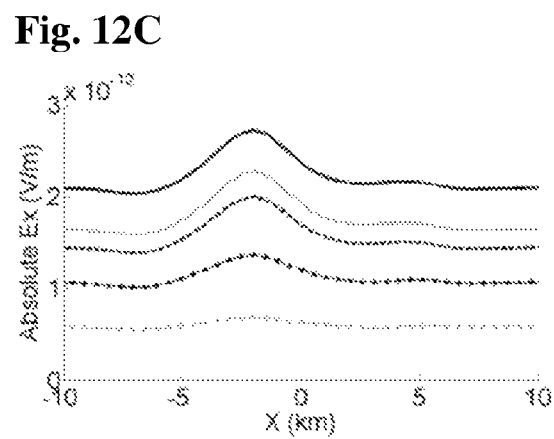
Figure 12D:
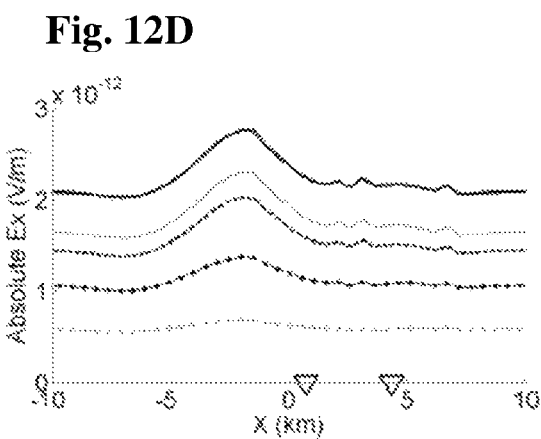

FIG. 11 demonstrates the time differentiation method that enables canceling the unwanted shallow effects almost completely, by means of subtraction of the responses arrived at different time moments after the current was shut off. Differences between the normalized responses were obtained at t=2 s after the current was shut off, at t=0 (solid line), at t=4 s and 1 s (solid line with dots), and at t=8 s and 1 s (dashed line). The response of $\Delta_t R^{norm}$ to the model of two deep reservoirs in the absence (FIG. 11A) and in the presence (FIG. 11B) of two shallow inclusions practically do not differ.

FIG. 12 shows the conventional dipole measurement (the horizontal electric field $E_x=-\Delta U$) as a function of midpoint between the dipole transmitter and coaxial dipole receiver. Each shallow structure gives two spikes on the profiling curve, significantly distorting the deep reservoir responses at all times: the first spike is present when the receiver is above the inclusion, and the second—when the transmitter is above it.

Figure 13A:
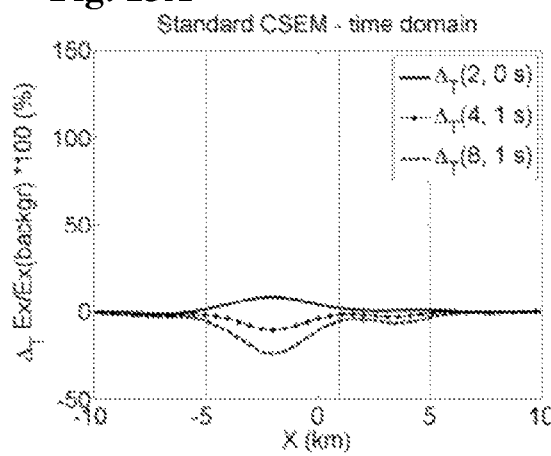
FIGS. 13A and 13B, collectively referred to herein as FIG. 13, show the time differentiation effect on the dipole-dipole measurement.
Figure 13B:
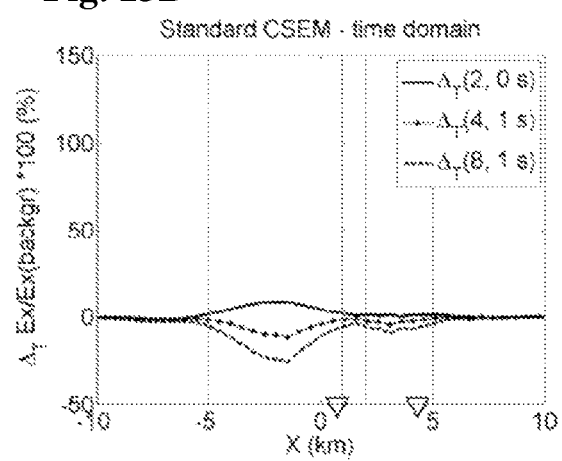

FIGS. 13A and 13B show the responses to the model after the time differentiation. A plot of the differences between the responses depicted in FIG. 12 is shown. Specifically, the plot shows between the normalized electric field obtained at t=2 s. after the current-off and at t=0 (solid line), at t=4 s. and 1 s. (solid line with dots), and at t=8 s. and 1 s. (dashed line). The subtraction reduces the effect of the shallow inclusion.

The time differentiation makes possible simple visual interpretation or 1D inversion of the deep reservoirs' responses in the presence of unwanted shallow structures, which otherwise may cripple the separate dipole-dipole and dipole-quadrupole measurements, masking the deep reservoirs' signature.

Various other components may be included and called upon for providing for aspects of the teachings herein. For example, additional materials, combinations of materials and/or omission of materials may be used to provide for added embodiments that are within the scope of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating at least one geophysical property, the method comprising:
   using a plurality of transmitter electrodes distributed in a conductive medium, periodically passing rectangular current impulses through the media;
   collecting a sequence of sounding data between each of the impulses with a receiver electrode disposed between the plurality;
   determining a first difference and a second difference of the electric potential between points of the collected data; and
   when each of the transmitters is excited, acquiring a focused measurement by simultaneously calculating a combination of at least one orthogonally weighted measurement and at least one axially weighted measurement from acquired measurements obtained by the receiver, wherein the weighting is obtained from a condition of equipotentiality in electrodes of the receiver;
   wherein data collected from deep measurements is used to estimate the at least one geophysical property of the conductive medium.

2. The method as in claim 1, wherein the deep measurements provide for estimating at least one of the following geophysical properties of the geological formation:

$\sigma(i\omega,\sigma_0,\eta,\tau)$—frequency-dependent electrical conductivity of elements of the medium, $\sigma_0$—electric conductivity of elements of the medium, $\eta$—a coefficient of induced polarization, and $\tau$—a time decay constant of the induced polarization.

3. An apparatus adapted for providing an estimate of at least one geophysical property in a conductive medium, the apparatus comprising:

a plurality of electrodes adapted for being distributed in the medium, the electrodes further adapted for being coupled to a power source for periodically passing rectangular current impulses through the electrodes and into the medium;

a receiver for collecting a sequence of measurements between each of the impulses; and a processor for simultaneously calculating a combination of at least one orthogonally weighted measurement and at least one axially weighted measurement from acquired measurements, wherein weighting is obtained from a condition of equipotentiality in electrodes of the receiver, and, a processor for using results of deep measurements to calculate the at least one geophysical property of the medium.

4. The apparatus as in claim 3, wherein the measurements comprise data from at least one of dipole measurements and quadrupole measurements.

5. The apparatus as in claim 3, wherein a difference is calculated in an x-direction and a y-direction.

6. The apparatus as in claim 3, wherein the deep measurements provide for estimating at least one of the following geophysical properties of the geological formation:

$\sigma(i\omega,\sigma_0,\eta,\tau)$—frequency-dependent electrical conductivity of elements of the medium, $\sigma_0$—electric conductivity of elements of the medium, $\eta$—a coefficient of induced polarization, and $\tau$—a time decay constant of the induced polarization.

7. The apparatus of claim 6, wherein the conductive media comprises at least one of sea water and sedimentary rocks.

8. A method for estimating a geophysical property, the method comprising:

periodically passing rectangular current impulses through a conductive media using a plurality of transmitter electrodes distributed therein;

collecting a sequence of sounding data from the impulses with a receiver electrode disposed between the plurality and in the media and collecting transient measurement data between the impulses;

when each transmitter electrode is excited, acquiring a focused measurement;

simultaneously calculating a combination of at least one orthogonally weighted measurement and at least one axially weighted measurement from acquired measurements, wherein weighting is obtained from a condition of equipotentiality in electrodes of the receiver;

normalizing the results from the calculations by applying the transient measurement data to provide normalized results that exhibit low noise contribution from shallow features; and, using the normalized results to estimate the geophysical property of the conductive media.

9. The method as in claim 8, wherein calculating comprises eliminating an axial component of current density, $j_x$, and an orthogonal component of current density, jy.

10. The method as in claim 8, wherein the property comprises at least one of:

electric conductivity, $\sigma_0$, induced polarization, $\eta$, and time decay constant of the induced polarization, $\tau$.

* * * * *